(12) United States Patent
Han

(10) Patent No.: US 6,442,922 B1
(45) Date of Patent: *Sep. 3, 2002

(54) TIRE-REINFORCING STEEL CORD AND PNEUMATIC RADIAL TIRE USING THE SAME

(75) Inventor: Yong Sig Han, Taejon-shi (KR)

(73) Assignee: Hankook Tire Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,762

(22) Filed: Feb. 14, 2000

(30) Foreign Application Priority Data

Jun. 29, 1999 (KR) .............................. 99-25400

(51) Int. Cl.⁷ ................................. D07B 1/06
(52) U.S. Cl. .............. 57/213; 57/58.49; 57/58.52; 57/138; 57/206; 57/212; 57/230; 57/237; 57/311
(58) Field of Search ...................... 57/58.49, 58.52, 57/138, 206, 212, 213, 230, 237, 311, 902; 152/527, 556

(56) References Cited

U.S. PATENT DOCUMENTS

| 5,722,226 A | * | 3/1998 | Matsumaru | 57/311 |
| 5,836,145 A | * | 11/1998 | Kohno | 57/213 |
| 6,189,309 B1 | * | 2/2001 | Han | 57/213 |

* cited by examiner

Primary Examiner—Danny Worrell
Assistant Examiner—Shaun R Hurley
(74) Attorney, Agent, or Firm—Fish & Richardson P.C.

(57) ABSTRACT

Disclosed herein are a tire-reinforcing steel cord and a pneumatic radial tire using the same. The tire-reinforcing steel cord includes an inner layer consisting of 3 filaments and an outer layer consisting of 7 or 8 filaments and surrounding the inner layer. The inner layer and the outer layer are twisted in such a manner that they have the same twist direction and the same twist pitch length, whereby the number of the twisting steps in the manufacture of the steel cord is reduced, and also the penetration of rubber into the steel cord is improved such that the steel cord has an improved durability upon application to tires.

10 Claims, 1 Drawing Sheet

[Fig. 1]
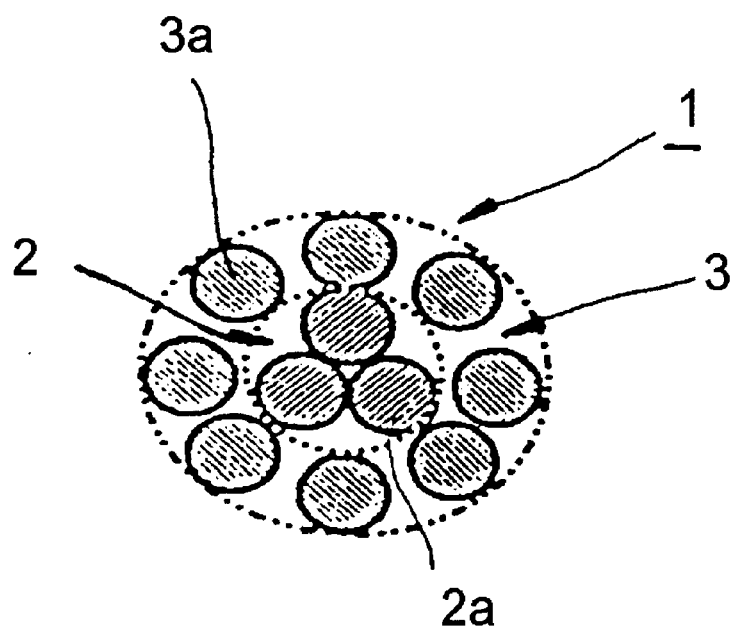
[Fig. 2]
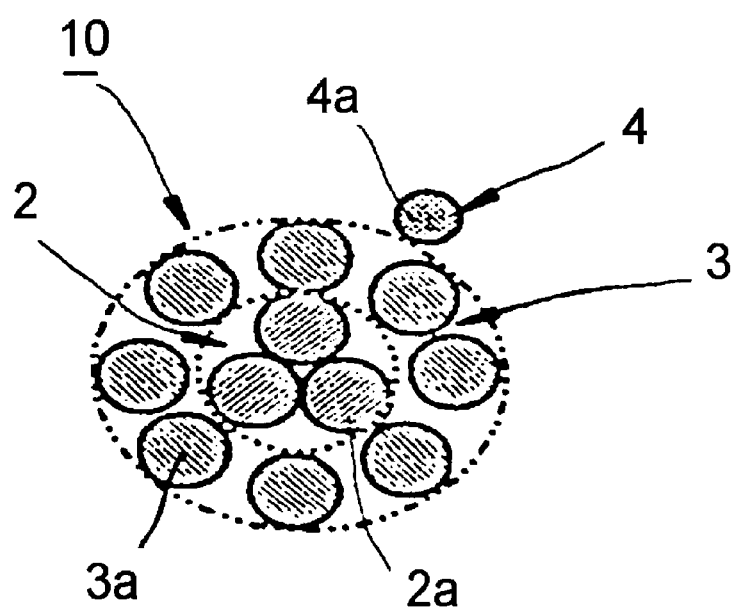

TIRE-REINFORCING STEEL CORD AND PNEUMATIC RADIAL TIRE USING THE SAME

BACKGROUND OF THE INVENTION

1. Field of the Invention

The present invention relates in general to a tire-reinforcing steel cord and a pneumatic radial tire using the same, and more particularly relates to a tire-reinforcing steel cord and a pneumatic radial tire using the same which cord includes an inner layer consisting of 3 filaments and an outer layer consisting of 7 or 8 filaments and surrounding the inner layer, and in which the inner layer and the outer layer are twisted in such a manner that they have the same twist direction and the same twist pitch length, whereby the number of the twisting steps in the manufacture of the steel cord is reduced, and also the penetration of rubber into the steel cord is improved such that the steel cord has an improved durability upon application to tires.

2. Description of the Prior Art

Generally, an example of a steel cord used in tires for use with trucks or buses includes a two-layer steel cord which comprises an inner layer consisting of a plurality of twisted filaments, and an outer layer consisting of a plurality of twisted filaments disposed around the first layer while being integral with the inner layer. A further example of the steel cord used in tires for trucks or buses includes a three-layer steel cord which further comprises an outermost layer consisting of a plurality of twisted filaments disposed around the outer layer of the two-layer steel cord, and a spiral wrap consisting of a single twisted filament surrounding the outermost layer. The two-layer steel cord is generally used for a belt-reinforcing cord in tires, while the three-layer steel cord is generally used for a carcass-reinforcing cord in tires.

In brief explanation of a method for producing the two-layer steel cord, for example, 3 filaments are first twisted in either a right or a left direction to form an inner layer. Then, 7 or 8 filaments are twisted in a twist direction opposite to that of the inner layer and a twist pitch length different from that of the inner layer to form an outer layer, with the outer layer surrounding the inner layer while being integral with the inner layer. In the two-layer steel cord having such a 3+7 or 3+8 construction, the diameter of filaments of each of the inner and outer layers is generally in the range of 0.30 to 0.38 mm.

In such a two-layer steel cord, however, as the inner layer filaments and the outer layer filaments are different in a twist direction and a twist pitch length from each other, they are limited in contact area with each other. In other words, the filaments of the inner layer are in point contact with the filaments of the outer layer. Accordingly, when a tire, to which the two-layer steel cord is applied, is repeatedly flexed, a phenomenon may occur in which the mechanical friction between the filaments, and the chemical corrosion of the filaments due to the penetration of moisture or salt into the steel cord, are simultaneously generated. Such a phenomenon is called "fretting fatigue". Such a fretting fatigue results in a degradation in the durability of the two-layer steel cord and the tire to which the steel cord is applied.

Moreover, in the two-layer steel cord, the inner layer and the outer layer are twisted in such a manner that they are different in a twisted direction and a twist pitch length from each other. Consequently, a twisting process is carried out for the inner layer and the outer layer, individually. This results in a reduction in productivity and an increase in the manufacturing costs.

Meanwhile, a representative standard for the three-layer steel cord is a "3+9+15+W" construction. In brief explanation of a method for producing the three-layer steel cord having such a construction, 3 filaments are first twisted in a certain direction to form an inner layer. Subsequently, 9 filaments are twisted in the same twist direction as that of the inner layer while using a twist pitch length different from that of the inner layer to form an intermediate layer, with the intermediate layer surrounding the inner layer while being integral with the inner layer. After that, 15 filaments are twisted in a twist direction opposite to that of the intermediate layer while using a twist pitch length different from that of the intermediate layer to form an outer layer, with the outer layer surrounding the intermediate layer while being integral with the intermediate layer. Then, one filament is twisted in a direction opposite to that of the outer layer while using a desired twist pitch length to form a spiral wrap, with the spiral wrap surrounding the outer layer while being integral with the outermost layer. Generally, the filaments of the inner, intermediate and outer layers are equal in diameter to each other over the range of 0.175 to 0.250 mm, whereas the diameter of the filament of the spiral wrap is varied, if necessary.

As the three-layer steel cord is high in strength by virtue of a plurality of filaments and is great in binding force due to the presence of the spiral wrap, it is generally used for a carcass-reinforcing steel cord or a belt-reinforcing steel cord in large tires used for trucks or buses. Like the case of the two-layer steel cord, however, in the three-layer steel cord, the inner layer, intermediate layer, outer layer, spiral wrap are also twisted in such a manner that these layers have different twist pitch length and/or different twist direction between the adjacent layers. Consequently, in the manufacture of such a steel cord, a twisting process is carried out for the inner layer, intermediate layer, outer layer, and spiral wrap, individually. This results in an reduction in productivity and an increase in the manufacturing costs.

SUMMARY OF THE INVENTION

Therefore, the present invention has been made in view of the above mentioned problems, and, therefore, an object of the invention is to provide a tire-reinforcing steel cord and a pneumatic radial tire using such a steel cord which is improved in durability, thereby extending the durable life of the tire, and which is manufactured by a reduced number of processing steps for the twisting process, thereby reducing the manufacturing costs while achieving an improvement in productivity.

In accordance with the present invention, this object is accomplished by providing a two-layer steel cord including an inner layer consisting of 3 filaments and an outer layer consisting of 7 or 8 filaments and surrounding the inner layer, in which the inner layer and the outer layer are twisted in such a manner that they are equal in a twist direction and a twist pitch length to each other.

Moreover, the present invention provides a pneumatic radial tire including the steel cord in accordance with the invention in at least one of a carcass, a chafer and a belt thereof.

BRIEF DESCRIPTION OF THE DRAWINGS

Other objects and aspects of the invention will be apparent from the following description of embodiments with reference to the accompanying drawings, in which:

FIG. 1 is a cross-sectional view illustrating a two-layer steel cord according to an embodiment of the present invention; and FIG. 2 is a cross-sectional view illustrating a two-layer steel cord according to another embodiment of the present invention.

DESCRIPTION OF THE PREFERRED EMBODIMENTS

Referring to FIG. 1, a steel cord 1 having a two-layer twisted structure according to one embodiment of the present invention is illustrated. As shown in FIG. 1, the steel cord 1 includes an inner layer 2 consisting of 3 twisted filaments 2a and an outer layer 3 consisting of 8 (or 7) twisted filaments 3a. The outer layer 3 is integral with the inner layer while surrounding the inner layer 2. Moreover, the inner layer 2 and the outer layer 3 have the same twist direction and the same twist pitch length.

The filaments 2a of the inner layer 2 have the same diameter ranging from 0.15 to 0.40 and the filaments 3a of the outer layer 3 also have the same diameter ranging from 0.15 to 0.40 mm. The diameter of each filament 2a of the inner layer 2 is in the range of 0.8 to 1.2 times the diameter of each filament 3a of the outer layer 3. Moreover, the filaments 2a in the inner layer 2 and the filaments 3a in the outer layer 3 have the twist pitch length ranging from 20 to 100 times the diameter of the filaments 3a in the outer layer 3.

The two-layer steel cord 1 is manufactured by twisting three filaments 2a to form the inner layer 2, while twisting 8 (or 7) filaments 3a to form the outer layer 3. In this regard, the inner layer 2 and the outer layer 3 have the same twist direction and the same twist pitch length, such that they are formed in one step to complete the two-layer steel cord.

Referring to FIG. 2, a steel cord 10 having a two-layer twisted structure according to another embodiment of the present invention is illustrated. As shown in FIG. 2, the steel cord 10 includes an inner layer 2 consisting of 3 twisted filaments 2a and an outer layer 3 consisting of 8 (or 7) twisted filaments 3a. The outer layer 3 is integral with the inner layer while surrounding the inner layer 2. The inner layer 2 and the outer layer 3 have the same twist direction and the same twist pitch length. Moreover, the steel cord 10 further includes a spiral wrap 4 consisting of one twisted filament 4a having a desired twist pitch length. The spiral wrap 4 has a twist direction opposite to that of the outer layer 3 while being integral with the outer layer 3.

In the steel cord 10 as shown in FIG. 2, the filaments 2a in the inner layer 2 and the filaments 3a in the outer layer 3 have the same diameter in the one layer and the same relations between the filaments 2a and 3a for the diameter and the twist pitch length as described above regarding the embodiment shown in FIG. 1. Preferably, the spiral wrap 4 has a twist pitch length ranging from 2 to 10 mm.

The two-layer steel cord 10 shown in FIG. 2 is manufactured as follows. Three filaments 2a are twisted to form the inner layer 2, while 8 (or 7) filaments 3a are twisted to form the outer layer 3. In this regard, the inner layer 2 and the outer layer 3 have the same twist direction and the same twist pitch length, such that they are formed in one twisting step. Thereafter, one filament 4a having a desired diameter is twisted opposite direction with that of inner layer 2 and outer layer 3 to form the spiral wrap 4, with the spiral wrap 4 surrounding the outer layer 3 while being integral with the outer layer 3, thereby completing the steel cord 10.

In the embodiments illustrated in FIGS. 1 and 2, for the filaments 2a in the inner layer 2 and the filaments 3a in the outer layer 3 except for the spiral wrap 4, these filaments are preferably made of those fabricated by drawing carbon steel having a carbon content of 0.70 to 1.20% by weight, and then plating the surface of the resulting products with Cu—Zn(brass),Cu-Sn(bronze),Cu(copper),Zn(zinc), Cu—Zn—Ni alloy, or Cu—Zn—Co alloy to a thickness of 0.01 to 5.00 micrometer. The plating of the surface of the filaments 2a and 3a with the above mentioned metals advantageously increases a adhesion force of the filaments 2a and 3a to rubber.

Meanwhile, the number of the filaments 3a in the outer layer 3 may be optionally changed into a desired number. However, it is preferred that the number of the filaments 3a is 7 or 8 as in the embodiments according to the present invention in view of various considerations, such as the diameter of each filament 3a and the penetration of rubber into the steel cord.

The two-layer steel cord illustrated in FIG. 1 has an elasticity of 95% or above as measured by a Loop tester. Consequently, it is preferably used for a reinforcement which requires a high elasticity, such as a belt-reinforcing cord in the tire. On the other hand, as the two-layer steel cord illustrated in FIG. 2 has an elasticity of about 80% as measured by a Loop tester, it is preferably used for a reinforcement which requires an elasticity of 70 to 90%, such as a carcass-reinforcing cord in the tire.

Table 1 below shows the measurement results for the physical properties of the two-layer steel cord (C1) not including the spiral wrap and the two-layer steel cord (C2) including the spiral wrap according to the present invention, as compared to those of the three-layer steel cord (R1) including the spiral wrap and the two-layer steel cord (R2) not including the spiral wrap according to the prior art. Additionally, Table 1 shows specifications for the manufacture of the steel cords, including the twist direction, the twist pitch length, etc.

As evident from Table 1, the steel cords in accordance the present invention are equal in mechanical properties, and a adhesion force to rubber with various aging conditions, as compared to the steel cords according to the prior art.

TABLE 1

| Steel cords | R1 (prior art) | R2 (prior art) | C1 (present invention) | C2 (present invention) |
| --- | --- | --- | --- | --- |
| Construction | 3 + 9 + 15 (0.22) + W | 3 +8 (0.35) | 3 + 8 (0.35) | 3 + 8 (0.28) + W |
| C content (wt %) in filament | 0.72 | 0.82 | 0.82 | 0.72 |
| Filament diameter (mm) (INL/IML/ OTL/SW)* | 0.22/0.22/ 0.22/0.15 | 0.31/—/ 0.35/— | 0.35/—/ 0.35/— | 0.28/—/ 0.28/0.15 |
| Twist length (mm) (INL/IML/ OTL/SW) | 6.0/12.0/ 18.0/5.0 | 10.5/—/ 18.0/— | 18.0/—/ 18.0/— | 13.0/— 13.0/5.0 |
| Twist direction (INL/IML/OTL/ SW) | right/right/ left/right | right/—/ left/— | right/—/ right/— | right/—/ right/left |
| Cord diameter (mm) | 1.60 | 1.48 | 1.48 | 1.23 |
| Breaking force (kgf) | 292 | 299 | 300 | 195 |
| Elongation at break (%) | 2.5 | 2.7 | 2.7 | 2.6 |
| Unit weight (g/m) | 8.47 | 8.30 | 8.22 | 5.40 |
| Elasticity (%)[a] | 82 | 98 | 98 | 81 |
| Stiffness (g – cm/ steel cord)[b] | 182 | 280 | 284 | 148 |
| Fatigue limit stress (kgf/mm$^2$)[c] | 90 or more | 90 or more | 90 or more | 90 or more |

TABLE 1-continued

| Steel cords | R1 (prior art) | R2 (prior art) | C1 (present invention) | C2 (present invention) |
|---|---|---|---|---|
| | (spiral wrap removal) | | | (spiral wrap removal) |
| Adhesion force to rubber (kgf/l inch)[d] | | | | |
| Initial (150° C., 30 min, vul.) | 175 | 186 | 185 | 120 |
| Heat aging (100° C.) | | | | |
| 7 days | 134 | 174 | 175 | 114 |
| 14 days | 123 | 171 | 172 | 110 |
| 21 days | 105 | 171 | 172 | 108 |
| Human condition (70° C., 96% R/H) | | | | |
| 7 days | 167 | 178 | 178 | 117 |
| 14 days | 132 | 176 | 175 | 112 |
| 21 days | 133 | 168 | 169 | 112 |
| Hot water condition (70° C.) | | | | |
| 7 days | 171 | 170 | 172 | 115 |
| 14 days | 160 | 171 | 172 | 109 |
| 21 days | 159 | 163 | 162 | 109 |
| Salt condition (20% NaCl) | | | | |
| 7 days | 154 | 174 | 172 | 114 |
| 14 days | 136 | 168 | 168 | 109 |
| 21 days | 141 | 163 | 164 | 108 |

*INL/IML/OTL/SW: Inner layer/Intermediate layer/Outer layer/Spiral wrap.
[a] tested by Loop tester.
[b] tested by Taber Stiffness Tester.
[c] tested under completely reversed cycle of stress (tensile and compressive) condition using rotating beam fatigue tester (RBT).
[d] tested according ASTM D2229.

Table 2 below shows the test results for characteristics of a pneumatic radial tire using the conventional steel cord and a pneumatic radial tire using the invented steel cord, according to manufacturing specifications thereof. In such tests, pneumatic radial tires having a 11.00R20 16PR size and being generally used with a dump truck, were used. Tread patterns, and specifications of all portions except for belt and carcass, were identical to the conventional tires. However, in the case of the carcass and belt in the pneumatic radial tire in accordance with the present invention, a thickness of topping rubber including steel cords in the forming of a rubber topping sheet and the number of steel cord strands per one inch width of the topping rubber sheet were changed, but a width, length, and cord angle of the carcass and belt were identical to the conventional tire. Moreover, a 15 ton dump truck was used in the tire field tests.

TABLE 2

| Radial tires | | K | T1 | T2 | T3 |
|---|---|---|---|---|---|
| Carcass | n | 10.75 | 10.75 | 16.1 | 16.1 |
| | t | 2.6 | 2.6 | 2.0 | 2.0 |
| Second belt | n | 11.0 | 11.0 | 11.0 | 11.0 |
| | T | 2.5 | 2.5 | 2.5 | 2.5 |
| Third belt | n | 11.0 | 11.0 | 11.0 | 11.0 |
| | T | 2.5 | 2.5 | 2.5 | 2.5 |

TABLE 2-continued

| Radial tires | | K | T1 | T2 | T3 |
|---|---|---|---|---|---|
| Weight (kg) | Carcass | 10.033 | 10.033 | 8.811 | 8.811 |
| | Second belt + third belt | 7.146 | 7.102 | 7.146 | 7.102 |
| | Total (carcass + second belt + third belt) | 17.179 | 17.135 | 15.957 | 15.913 |
| Tire noise (decibel) (50 km/hr) | | 87.5 | 87.7 | 87.0 | 87.1 |
| Durability under high speed (hr) (FMVSS 109 TPO6 condition) | | 95 | 97 | 95 | 96 |
| Running durability (hr) (slip angle 2*, 45 km/hr) | | 60 | 64 | 63 | 60 |
| Rolling resistance (newton) (speed 60 km/hr, standard air pressure) | | 208.3 | 208.0 | 200.5 | 200.1 |
| Abrasion resistance index (standard air pressure) | | 100 | 100 | 99 | 101 |

In Table 2 above, the radial tire K is a pneumatic radial tire according to the prior art, in which a carcass is one ply and a conventional steel cord (R1, Table 1) of a 3+9+15 (0.22)+W construction was applied to one carcass, the conventional steel cord of a 3(0.20)+6(0.35) construction was applied to a first belt (a center portion of tire circumference), conventional steel cords (R2, Table 1) of a 3+8(0.35) construction were applied to second and third belts, and a conventional steel cord of a 3×7(0.22) construction having a high elongation was applied to a fourth belt.

Another radial tire T1 in Table 2 is a first example of a pneumatic radial tire in accordance with the present invention, in which a steel cord (C1; Table 1) of a 3+8(0.35) construction according to the present invention was substituted for the steel cords applied to the second and third belts in the conventional radial tire (K).

Another radial tire T2 is a second example of a pneumatic radial tire in accordance with the present invention, in which a steel cord (C2; Table 1) of a 3+8(0.28)+W construction according to the present invention was substituted for the steel cord applied to the carcass in the conventional radial tire (K).

And, another radial tire T3 in Table 2 is a third example of a pneumatic radial tire in accordance with the present tire, in which a steel cord (C1; Table 1) of a 3+8 construction according to the present invention, and a steel cord (C2; Table 1) of a 3+8(0.28)+W construction according to the present invention, were substituted for the steel cords applied to the second and third belts, and a steel cord applied to the carcass, respectively, in the above mentioned conventional radial tire (K).

Moreover, in Table 2, n represents the number of steel cord strands per one inch width of the topping rubber sheet, and t represents a thickness of the sheet including the steel cords. Furthermore, in the rolling resistance data listed in Table 2, lower number indicates good rolling resistance. In the abrasion resistance data in Table 2, higher number indicates good abrasion resistance.

As evident from Table 2 above, the first example (T1) of the tire according to the present invention is equal in characteristics as compared to the conventional pneumatic radial tire (K). Also, the second and third examples (T2 and T3) are excellent in a rolling resistance, and reduced in weight by 1.22 to 1.26 kg per tire by virtue of a reduction in the weight of the belt and carcass, as compared to the prior art tire (K), while maintaining other characteristics equal to the conventional tire (K).

Meanwhile, for applying steel cords according to the present invention to a carcass, a chafer, and a belt of the pneumatic radial tire as in Table 2 above, the steel cords are embedded in topping rubber in the form of a sheet while preferably meeting the following conditions:

$$n \geq 0.6/(0.27d1^2 + 0.73d2^2),$$

and $$t = (D+0.1) \text{ to } (D+2.4)$$

where, n represents the number of strands of steel cord per one inch width of the rubber topping sheet, t represents a thickness of the rubber topping sheet including a steel cord according to the present invention, d1 represents a diameter (mm) of each filament of the inner layer in the steel cord according to the present invention, d2 represents a diameter (mm) of each filament of the outer layer in the steel cord in accordance with the present invention, and D represents a diameter (mm) of the steel cord according to the present invention. Where the steel cord includes the spiral wrap, the diameter D is calculated including the spiral wrap.

As apparent from the above description, the present invention provides a two-layer steel cord having a 3+7 or 3+8 construction and a pneumatic radial tire using the same, in which an inner layer and an outer layer are twisted in one step in such a manner that they have the same twist direction and the same twist pitch length, whereby the number of the twisting steps in the manufacture of the steel cord is reduced, and also the inner layer and the outer layer are in stable and almost complete line contact with each other. A fretting fatigue occurring between the inner layer and the outer layer due to repeated movements of the tire, to which the steel cord is applied, is minimized by virtue of the stable and almost complete line contact between the inner layer and the outer layer. This results in an improvement in the durability of the tire.

Meanwhile, while the pneumatic radial tire, to which the steel cord according to the present invention is applied, is equal in characteristics to the conventional tire, it is reduced in weight by 1.22 kg to 1.26 kg per tire and also reduced in the manufacturing costs, as compared with the conventional tire.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A tire-reinforcing steel cord including an inner layer consisting of 3 filaments and an outer layer consisting of 7 or 8 filaments surrounding the inner layer, in which the inner layer and the outer layer are twisted in such a manner that they are equal in a twist direction and a twist pitch length to each other.

2. The tire-reinforcing steel cord of claim 1 further including a spiral wrap consisting of one filament surrounding the outer layer, the spiral wrap being twisted in a direction opposite to that of the outer layer.

3. The tire-reinforcing steel cord of claim 1, wherein the filaments in the inner layer have a diameter in a range between 0.8 to 1.2 times of a diameter of the filaments in the outer layer, the diameter of the filaments in the inner and outer layers are in a range of 0.15 to 0.40 mm, and the filaments in the inner and outer layers have a twist pitch length in a range between 20 to 100 times the diameter of the filaments in the outer layer.

4. The tire-reinforcing steel cord of claim 2, wherein the filaments in the inner layer have a diameter ranging from 0.8 to 1.2 times that of the filaments in the outer layer, the diameter of the filaments in the inner and outer layers being in the range of 0.15 to 0.40 mm, and the filaments in the inner and outer layers have a twist pitch length ranging from 20 to 100 times the diameter of the filaments in the outer layer, and the spiral wrap has a twist pitch length in a range between 2 millimeter (mm) to 10 mm.

5. The tire-reinforcing steel cord of claim 1, wherein the filaments in the inner and outer layers are formed of carbon steel having a carbon content in a range between 0.70 to 1.20 percent by weight, and include a surface plating of Cu—Zn, Cu—Sn, Cu, Zn, Cu—Zn—Ni or Cu—Zn—Co alloy having a thickness in a range between 0.01 micrometer to 5.0 micrometer.

6. A steel cord including an inner layer comprising 3 filaments and an outer layer comprising at least 7 filaments surrounding the inner layer, wherein the inner layer and the outer layer are twisted in the same direction and have an equal twist pitch length.

7. The steel cord of claim 6 further including a spiral wrap comprising one filament surrounding the outer layer, the spiral wrap being twisted in a direction opposite to that of the outer layer.

8. A steel cord comprising:

an inner layer having 3 filaments; and an outer layer having 7 filaments that surround the inner layer, wherein the inner layer and the outer layer are twisted in the same direction and have an equal twist pitch length, wherein said cord has no further layer with filaments.

9. The steel cord of claim 8 wherein the filaments in the inner layer have a diameter in a range between 0.8 to 1.2 times of a diameter of the filaments in the outer layer, the diameter of the filaments in the inner and outer layers are in a range of 0.15 to 0.40 mm, and the filaments in the inner and outer layers have a twist pitch length in a range between 20 to 100 times the diameter of the filaments in the outer layer.

10. The steel cord of claim 8 wherein the filaments in the inner and outer layers are formed of carbon steel having a carbon content in a range between 0.70 to 1.20 percent by weight, and include a surface plating of Cu—Zn, Cu—Sn, Cu, Zn, Cu—Zn—Ni or Cu—Zn—Co alloy having a thickness in a range between 0.01 micrometer to 5.0 micrometer.

* * * * *